United States Patent
Kato et al.

(10) Patent No.: US 6,665,260 B2
(45) Date of Patent: Dec. 16, 2003

(54) OPTICAL RECORDING MEDIUM INCLUDING PROTRUDING WINDING PARTS USED AS PREPITS

(75) Inventors: Tatsuya Kato, Chuo-ku (JP); Hajime Utsunomiya, Chuo-ku (JP); Hiroyasu Inoue, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 67 days.

(21) Appl. No.: 09/899,152

(22) Filed: Jul. 6, 2001

(65) Prior Publication Data

US 2002/0018439 A1 Feb. 14, 2002

(30) Foreign Application Priority Data

Jul. 7, 2000 (JP) ............................ 2000-207455
Dec. 5, 2000 (JP) ............................ 2000-370702
Jun. 15, 2001 (JP) ............................ 2001-181795

(51) Int. Cl.$^7$ .................................................. G11B 7/24
(52) U.S. Cl. ................................. 369/275.4; 369/275.3
(58) Field of Search ........................ 369/275.4, 275.3, 369/275.1, 275.2, 44.27, 44.25, 44.58, 53.41, 44.13, 47.1, 277, 53.11, 53.2; 428/64.1, 64.4

(56) References Cited

U.S. PATENT DOCUMENTS

| | | | | |
|---|---|---|---|---|
| 5,452,284 | A | * | 9/1995 | Miyagawa et al. ....... 369/44.28 |
| 5,602,823 | A | * | 2/1997 | Aoki et al. ............... 369/275.3 |
| 5,602,824 | A | * | 2/1997 | Ooki et al. ............... 369/275.4 |
| 6,125,101 | A | | 9/2000 | Kikukawa et al. ........ 369/275.4 |
| 6,181,672 | B1 | * | 1/2001 | Muramatsu et al. ..... 369/275.4 |
| 6,295,271 | B1 | * | 9/2001 | Inui et al. ................ 369/275.4 |
| 6,307,824 | B1 | * | 10/2001 | Kuroda et al. ........... 369/53.11 |
| 6,469,961 | B2 | * | 10/2002 | Akiyama et al. ......... 369/44.13 |
| 6,504,815 | B1 | * | 1/2003 | Fujii et al. ............... 369/275.4 |

FOREIGN PATENT DOCUMENTS

| | | |
|---|---|---|
| JP | 9-326138 | 12/1997 |
| JP | 2000-132868 | 5/2000 |

OTHER PUBLICATIONS

Tetsuya Kondo, et al., "1-Beam-Mastering of Groove Recording Disc with LPP Address", Optical Data Storage Topical Meeting 2001, pp. 256–258.

* cited by examiner

*Primary Examiner*—Ali Neyzari
(74) *Attorney, Agent, or Firm*—Oblon, Spivak, McClelland, Maier & Neustadt, P.C.

(57) ABSTRACT

In an optical recording medium wherein grooves or lands formed on the supporting substrate are used for the recording tracks, and wherein prepits are also formed, production of the supporting substrate and high density recording are facilitated. This medium comprises a supporting substrate and a recording layer on the substrate wherein the surface of the supporting substrate on which the recording layer is formed is formed with alternating continuous convex portions and continuous concave portions which are substantially parallel to each other. The adjacent continuous convex portions are connected by bridging convex portions extending in transverse direction, and the bridging convex portion has a planar configuration that its width is minimum at or near the center between the adjacent continuous convex portions. The supporting substrate is produced by using a master disk which has a resist layer formed with mother patterns of each of the continuous convex portions, continuous concave portions, and prepits. In the production of the master disk, the resist layer is intermittently irradiated with one exposure beam, and the area irradiated is used as the mother pattern of the continuous concave portions or convex portions, and the area which was not irradiated is used as the mother pattern of the prepits.

13 Claims, 3 Drawing Sheets

OPTICAL RECORDING MEDIUM INCLUDING PROTRUDING WINDING PARTS USED AS PREPITS

BACKGROUND OF THE INVENTION

1. Field of the Invention

This invention relates to an optical recording medium and its production method.

2. Prior Art

Figure 5:
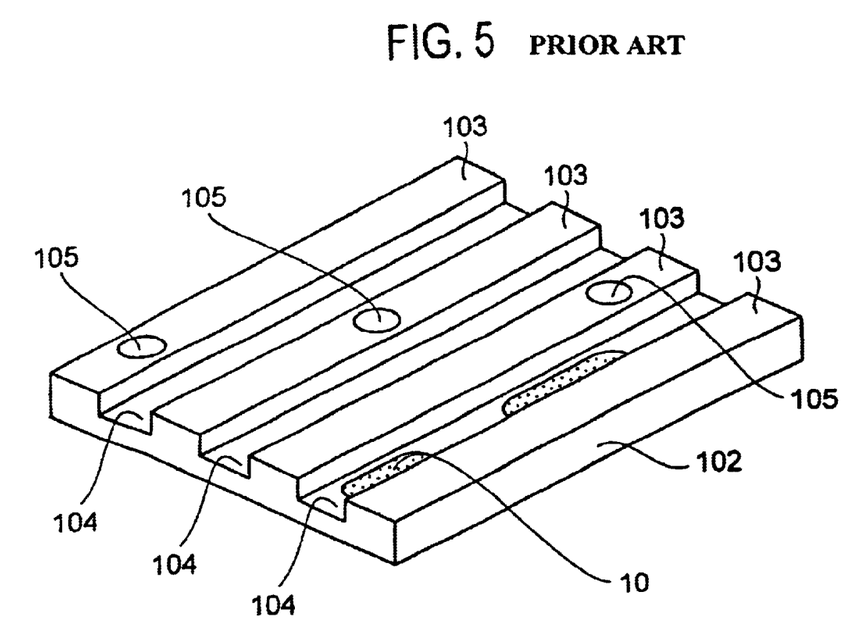
FIG. 5 is a partial perspective view of a prior art optical recording medium.
Figure 6:
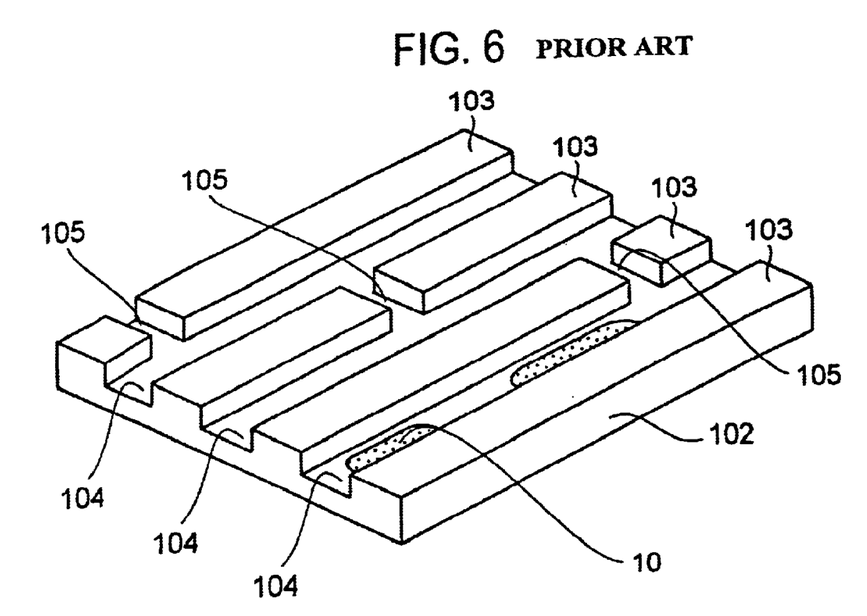
FIG. 6 is a partial perspective view of another prior art optical recording medium.

Typical optical recording mediums include write once disks such as CD-R and DVD-R wherein an organic dye is used for the recording material, and rewritable disks such as CD-RW and DVD-RW wherein a phase change recording material is used for the recording material. In these optical recording mediums, the recording layer is formed on the disk substrate which has been formed with a tracking groove (continuous concave portion) In the cases of the DVD-R and the DVD-RW which are to be recorded at a high density, the grooves are used for the recording tracks, and in addition, prepits bearing preformat information including the addressing information are formed along the continuous convex portion (which is called land) between the adjacent grooves. Typical embodiments of the medium of such structure are shown in FIGS. 5 and 6. In the medium of such embodiments, a recording layer (not shown) is formed on the substrate 102, and substantially parallel grooves 104 are formed on one surface of the substrate 102. The recording/reading laser beam is irradiated from the lower side of the drawings. The groove 104 is a recording track wherein record marks 10 are formed, and a land 103 is defined between the adjacent two grooves 104 and 104. The land 103 is formed with prepits 105. The optical disk which has the structure shown in FIG. 5 is disclosed in Japanese Patent Application Laid-Open No. (JP-A) 326138/1997, FIG. 15, and the optical disk with the structure of FIG. 6 is shown in JP-A 326138/1997, FIG. 3 and JP-A 132868/2000, FIG. 1(a).

Next, a typical process for producing a disk substrate is described.

A disk substrate is typically prepared by injection molding a resin using a stamper having formed thereon a mother pattern for the prepits and grooves. The stamper is usually formed from nickel. In order to manufacture the stamper, a disk master is first prepared, and a master stamper (a disk after one transcription), a mother stamper (a disk after two transcriptions), a child stamper (a disk after three transcriptions), and the like are prepared from the diskmaster.

The following process is generally employed for the manufacture of the disk master. First, a resist layer comprising a resist material such as photoresist is applied on the surface of a rigid substrate comprising a material like glass. The resist layer is then exposed to an exposure beam such as laser beam to form a latent image of the desired pattern, followed by development. The disk master is thereby produced by the patterning of the resist layer.

Using the disk master, a stamper is manufactured usually by the following process. First, to impart electric conductivity to the surface of the resist layer on the disk master, a nickel thin film is formed as by sputtering or electroless plating. Electroforming is then effected to deposit an electroformed nickel film on the nickel thin film. Then, the laminate of the nickel thin film and the electroformed nickel film is stripped from the resist layer. The laminate is ready for use as the master stamper. The mother stamper is prepared by electroforming a film on the surface of the master stamper and striping the electroformed nickel film. It is recommended to previously oxidize the surface of the master stamper so that the electroformed nickel film may be readily stripped therefrom. Alternatively, a child stamper may be similarly prepared using the mother stamper and used as the stamper.

In the process of preparing a disk master, the minimum width of the latent image pattern formed in the resist layer is limited by the diameter of a laser beam spot. The beam spot diameter w is represented by $w = k \cdot \lambda / NA$ wherein $\lambda$ is the wavelength of the laser beam, NA is the numerical aperture of an objective lens in an optical system, and k is a constant which is determined by the aperture shape of the objective lens and the intensity distribution of an incident light flux. In the formation of a latent image pattern corresponding to the groove, the beam is scan in spiral manner. When prepits are to be formed between the grooves, two beams are used in the formation of the latent image pattern, and one beam is continuously irradiated for the formation of the groove pattern while the other beam is intermittently irradiated to form the prepit pattern. The process as described above wherein two beams are used is referred in the present invention as "two beam process".

SUMMARY OF THE INVENTION

As described above, in the manufacture of a disk master of the structure wherein prepits are formed between the grooves, independent control of the two exposure beams is required in the photolithography, and structure and control of the exposure system inevitably becomes complicated.

In addition, improvement in the recording density requires decrease in the length of the prepits. The conventional process wherein the resist layer is intermittently irradiated with the beam and the area irradiated with the beam is used for the prepit is associated with the problem that the size of the prepit is limited by the wavelength of the beam as well as the numerical aperture of the optical system used for the irradiation. To be more specific, when the length of the prepit is reduced (that is, when the exposure time is reduced) with the wavelength of the beam and the numerical aperture kept unchanged, the resist layer will not be dug to a depth near its presumed depth in the formation of the prepit pattern in the resist layer, and this results in the failure of forming the prepits having the predetermined depth, and hence, in the difficulty in reading the prepits. In the meanwhile, substantial change in the exposure system such as decrease in the wavelength of the beam used or change of the objective lens to the one having a larger numerical aperture invites significant increase in the cost.

An object of the present invention is to facilitate the production of the supporting substrate and to facilitate a high density recording in an optical recording medium wherein grooves or lands formed in the supporting substrate are used for the recording tracks and wherein prepits are formed.

Such objects are attained by the present invention as described in (1) to (12), below.

(1) An optical recording medium comprising a supporting substrate and a recording layer on the substrate wherein the surface of the supporting substrate on which the recording layer is formed is formed with alternating continuous convex portions and continuous concave portions which are substantially parallel to each other, wherein the adjacent continuous convex portions are connected by bridging convex portions which extend in transverse direction, and the bridging convex portion has a planar configuration that its width is minimum at or near the center between the adjacent continuous convex portions.

(2) An optical recording medium according to the above (1) wherein said bridging convex portions are used as prepits.

(3) An optical recording medium according to the above (1) or (2) wherein isolated concave portions are formed in said continuous convex portions and said isolated concave portions are used as prepits.

(4) An optical recording medium according to any one of the above (1) to (3) wherein the continuous concave portion has winding parts that protrude into the adjacent continuous convex portion, and the protruding parts formed in the adjacent continuous convex portion are used as prepits.

(5) An optical recording medium comprising a supporting substrate and a recording layer on the substrate wherein the surface of the supporting substrate on which the recording layer is formed is formed with alternating continuous convex portions and continuous concave portions which are substantially parallel to each other, wherein
    the adjacent continuous concave portions are connected by bridging concave portions which extend in transverse direction, and the bridging concave portion has a planar configuration that its width is minimum at or near the center between the adjacent continuous concave portions.

(6) An optical recording medium according to the above (5) wherein said bridging concave portions are used as prepits.

(7) An optical recording medium according to the above (5) or (6) wherein isolated convex portions are formed in said continuous concave portions and said isolated convex portions are used as prepits.

(8) An optical recording medium according to any one of the above (5) to (7) wherein the continuous convex portion has winding parts that protrude into the adjacent continuous concave portion, and the protruding parts formed in the adjacent continuous concave portion are used as prepits.

(9) An optical recording medium according to any one of the above (1) to (8) wherein said continuous convex portion or said continuous concave portion is used for the recording track.

(10) An optical recording medium according to any one of the above (1) to (9) further comprising a substrate or layer which is transparent to the recording/reading laser beam formed on said supporting substrate, wherein said recording layer is irradiated by the laser beam that has passed through said substrate or layer, wherein, said continuous convex portions function as grooves and said continuous concave portions function as lands.

(11) An optical recording medium according to any one of the above (1) to (9) wherein said supporting substrate is transparent to the recording/reading laser beam and the recording layer is irradiated by the laser beam that has passed through the supporting substrate, wherein
    said continuous convex portions function as lands and said continuous concave portions function as grooves.

(12) A method for producing an optical recording medium comprising a supporting substrate and a recording layer on the substrate wherein the surface of the supporting substrate on which the recording layer is formed is formed with alternating continuous convex portions and continuous concave portions which are substantially parallel to each other, and prepits are formed along the continuous convex portions or the continuous concave portions, wherein
    the disk master used for the production of said supporting substrate having a resist layer formed with a mother pattern of said continuous convex portions, said continuous concave portions, and said prepits is formed by
    irradiating the resist layer with an exposure beam to form the mother pattern, and the step of the exposure is accomplished by intermittently irradiating the layer with one exposure beam and using the area irradiated with the exposure beam for the mother pattern of the continuous concave portion or the continuous convex portion, and the area that was not irradiated with the exposure beam for the prepits.

DETAILED DESCRIPTION OF THE INVENTION

Figure 1:
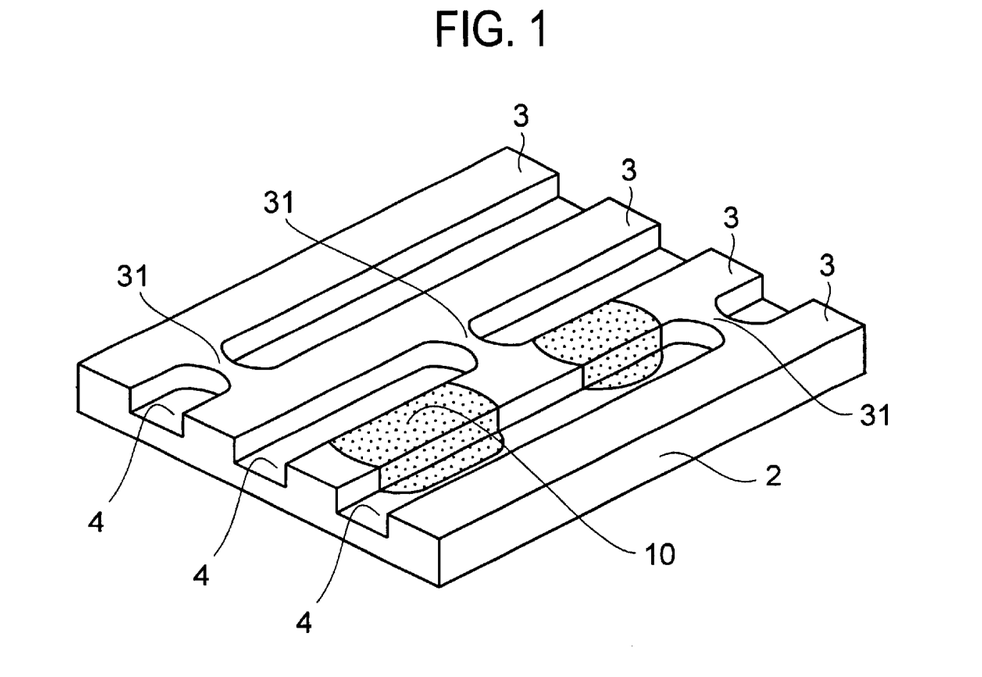
FIG. 1 is a partial perspective view of the optical recording medium according to an embodiment of the present invention.

An embodiment of the optical recording medium of the present invention is shown in FIG. 1. The optical recording medium of the present invention has a supporting substrate 2 and a recording layer (not shown). The surface of the supporting substrate 2 on which the recording layer is to be formed is formed with alternating continuous convex portions 3 and continuous concave portions 4 which are substantially parallel to each other. The supporting substrate 2 is usually in the shape of a disk, and the continuous convex portions 3 or concave portions 4 provided are either spiral or concentric. The recording layer may be formed either in direct contact with the continuous convex portions 3 and the continuous concave portions 4 or with intervening layers such as dielectric layer to cover the continuous convex portions 3 and the continuous concave portions 4.

The supporting substrate 2 shown in FIG. 1 has bridging convex portions 31 extending in transverse direction which connect adjacent continuous convex portions 3 and 3, and therefore, the continuous concave portion 4 defined between the two adjacent continuous convex portions 3 and 3 is disrupted by the bridging convex portions 31. The elevation of the continuous convex portion 3 and the bridging convex portion 31 from the bottom of the continuous concave portion 4 is substantially equal. The planar configuration of the bridging convex portion 31 is such that its width is minimum at or near the center between the adjacent continuous convex portions 3 and 3.

In this medium, the continuous convex portion 3 is used for the recording track, and the recordmarks 10 are formed along this continuous convex portion 3. The bridging convex portions 31, on the other hand, function as prepits. The recording track may be irradiated by the recording/reading laser beam either from the top side of the drawing or from the bottom side of the drawing through the supporting substrate 2. When the medium is irradiated by the laser beam from the top side of the drawing, the continuous convex portion 3 functions as the groove and the continuous concave portion 4 functions as the land. On the other hand, when the medium is irradiated by the laser beam from the bottom side of the drawing, the continuous convex portion 3 functions as the land and the continuous concave portion 4 functions as the groove. In other words, in either case, the area on the side of (the area which is relatively near to) the laser beam source is the groove, and the area on the side of (the area which is relatively far to) the laser beam source is the land.

Typically, a pit (concave portion) in an optical recording medium is an area whose bottom surface is nearer to the laser beam source compared to the surrounding area, and if the laser beam is irradiated from the bottom side of the drawing in FIG. 1, the pit in general sense is a concave portion formed in the upper surface of the supporting substrate 2. The bridging pit 31 in FIG. 1 is protruding from its surrounding area contrary to the case of the ordinary pits. The pit of the present invention also includes such case, and as a matter of fact, the bridging pit 31 functions as prepits even if the laser beam is irradiated from the bottom side of the drawing.

The purpose the prepits are used is not particularly limited. The prepits, however, are generally used for the purpose of retaining preformat information and/or for the purpose of servo control. Exemplary preformat information include addressing information and/or synchronic information, and exemplary servo controls include focusing servo control and/or tracking servo control.

When the continuous convex portion 3 is used for the recording track in FIG. 1, it follows that the prepits are present in the area in between the two adjacent recording tracks. On the other hand, when the medium is to be imparted with addressing information and timing information by providing a wobbled recording track, it is necessary that the linear area which had been irradiated with the exposure beam in the manufacture of the master disk is used for the recording track, and in this case, the continuous concave portion 4 in FIG. 1 is used for the recording track and the prepits in this case will be present along the recording track. When the prepits are present along the recording track in the medium manufactured by the two beam process, reading of the record marks will be difficult if the record marks are formed over the prepits since the two beam process is incapable of forming the prepits having a length significantly shorter than that of the record marks, and to be more specific, since the presence of the prepits have great influence on the configuration of the record marks which are formed on the prepits, and frequency of the signal obtained by reading the prepits is close to the frequency of the signal obtained by reading the record marks. On the other hand, the present invention has enabled to form prepits which have a length significantly shorter than that of the record marks, and therefore, even when the record marks are formed over the prepits, separate reading of the information of the recordmarks and the information of the prepits is sufficiently facilitated. As a consequence, in the case of the medium of the present invention, the recording capacity will be just as much when the prepits are present in the recording track as in the case wherein no prepits are present in the recording track.

When the recording/reading laser beam is irradiated from the upper side of the drawing, a light-transmitting substrate or layer is usually provided on the recording layer, and this substrate or layer which is sufficiently transparent to the laser beam protects the recording layer. In this case the supporting substrate need not be transparent to the laser beam. The light-transmitting substrate or layer may be a resin layer formed by coating, a layer formed by bonding a resin sheet, or a layer formed by bonding a flexible or rigid plate of a resin or glass. The light-transmitting layer comprising the resin layer or the resin sheet may be as thin as about 300 $\mu$m or less, and the medium provided with such light-transmitting layer is advantageous for use in the reading with an optical pickup having an objective lens having a high NA of about 0.75 to 0.95. Increase in the NA is associated with an increase the coma aberration, and hence, with decrease in the tilt margin. This problem, however, can be improved by providing a thin light-transmitting layer. The light-transmitting layer can also be constituted from an inorganic material such as an oxide, nitride, carbonate or carbon. The light-transmitting layer comprising an inorganic layer can be formed to a thickness as thin as about 500 nm or less.

The supporting substrate used in the medium of the present invention is formed as in the case of conventional disk substrates by injection molding using a stamper. The present invention, however, is different in the production method of the master disk used for the manufacture of the stamper.

When a master disk is produced in the present invention, a positive resist layer is formed on the surface of a highly rigid substrate such as a glass substrate, and after exposing the resist layer with exposure beam, the exposed resist layer is developed to thereby accomplish the patterning of the resist layer. This is common with the conventional procedure of manufacturing a master disk.

In the present invention, however, the beam used in the exposure is only one beam, and this beam is irradiated intermittently by on/off modulation. The area irradiated with the beam corresponds to the continuous concave portion 4, and the area not irradiated with the beam corresponds to the bridging convex portion 31. Accordingly, the present invention has enabled to produce all of the patterns corresponding to the lands, grooves, and prepits on the master disk by using only one beam, and the manufacture of the master disk is simplified compared to the conventional master disks. In addition, there is difference between the present invention and the conventional two beam process that the area irradiated with the beam corresponds to the prepit, whereas in the present invention, the area formed with the beam output cut corresponds to the prepit (bridging convex portion 31). The opposite ends of the continuous concave portion 4 are the points at which the irradiation of the beam has ended and started, and these ends have rounded shape corresponding to the shape of the beam spot. As a consequence, the bridging convex portion 31 disrupting the two consecutive two continuous concave portion 4 and 4 has a configuration that its width is minimum at about the center between the adjacent continuous convex portions 3 and 3. The bridging convex portion 31, however, may have other planar configuration depending on the shape of the exposure beam spot and conditions of the beam irradiation.

The thus formed bridging convex portions 31 (prepits) are not limited for their length by the diameter of the spot of the beam used for the exposure, and therefore, the length of the prepits can be reduced with no significant change in the optical system used for the irradiation of the exposure beam. This is quite advantageous for increasing the recording density.

The medium of the structure shown in FIG. 1 may be produced by using a stamper which has been transcribed for an odd number of times such as a master stamper with the number of transcription of once and a child stamper with the number of transcription of three times. However, a medium having the supporting substrate manufactured by using a stamper which has been transcribed for an even number of times such as a mother stamper is also included within the scope of the present invention. In the present invention, the merits as described are realized in the manufacture of the master disk, and such merits do not depend on whether the stamper used in the production of the medium is the one manufactured from the master disk for an odd number of times or for an even number of times.

In the production of the medium of the present invention, the production method of the conventional optical disks may be followed except that only one beam is used in the exposure step in the manufacture of the master disk, and that the beam is intermittently irradiated to use the area not irradiated with the beam for the prepits.

Figure 2:
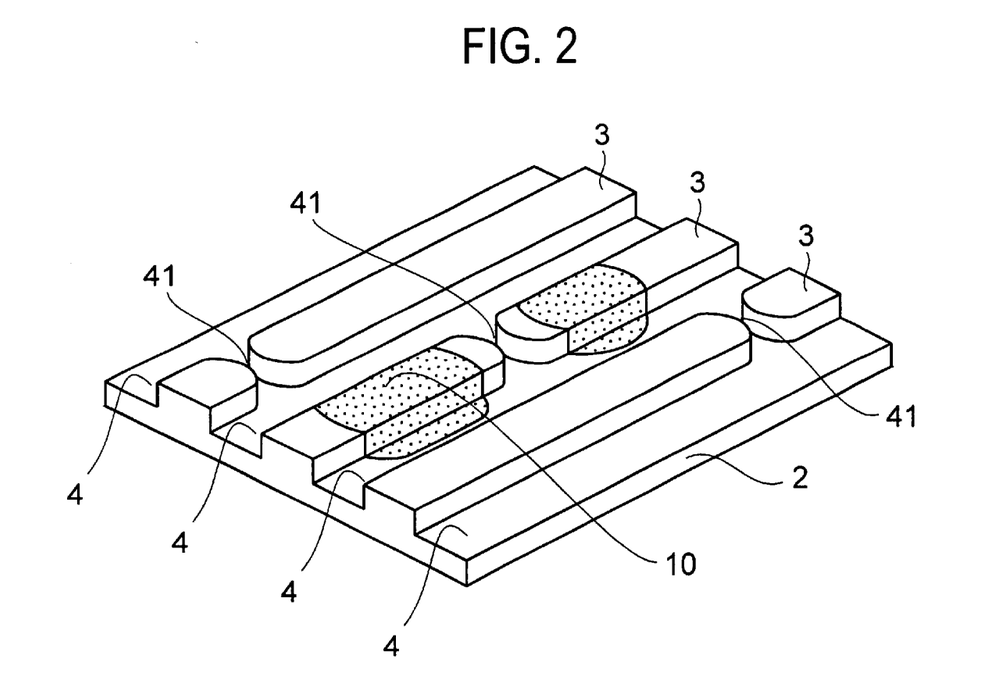
FIG. 2 is a partial perspective view of the optical recording medium according to another embodiment of the present invention.

FIG. 2 shows an embodiment of the supporting substrate 2 produced by mother stamper. The convex portion and concave portion pattern on the upper surface of this supporting substrate is in reverse relationship with the convex portion and concave portion pattern on the upper surface of the supporting substrate 2 shown in FIG. 1. The supporting substrate 2 shown in FIG. 2 has bridging concave portions 41 as a concave portion connecting adjacent continuous concave portions 4 and 4, and the continuous convex portion 3 defined by the two adjacent continuous concave portions 4 and 4 is disrupted by the bridging concave portions 41. The elevation of the top of the continuous convex portion 3 from the bottom of the concave portion is substantially equal in the bridging concave portion 41 and the continuous concave portion 4. The bridging concave portion 41 shown has a planar configuration that its width is minimum at about its center between the adjacent continuous concave portions 4 and 4. The bridging concave portion 41 functions as the prepits.

When the continuous concave portion 4 in FIG. 2 is used for the recording track, the prepits will be located between two recording tracks. On the other hand, when the recording track is to be wobbled to enable the recording track itself to retain the addressing information and timing information, the linear area irradiated with the exposure beam in the master disk manufacture process needs to be used for the recording track. In this case, therefore, the continuous convex portion 3 wherein prepits are present should be used for the recording track. As described above, the present invention has enabled to form the prepits having a length which is significantly shorter than that of the record marks, and separate reading of the information retained in the record marks and the prepits is facilitated even when the record marks are formed on the prepits. Therefore, even when the continuous convex portion 3 along which prepits are located is used for the recording track, a recording capacity equivalent to the case wherein the continuous concave portion 4 is used for the recording track can be retained.

Figure 3:
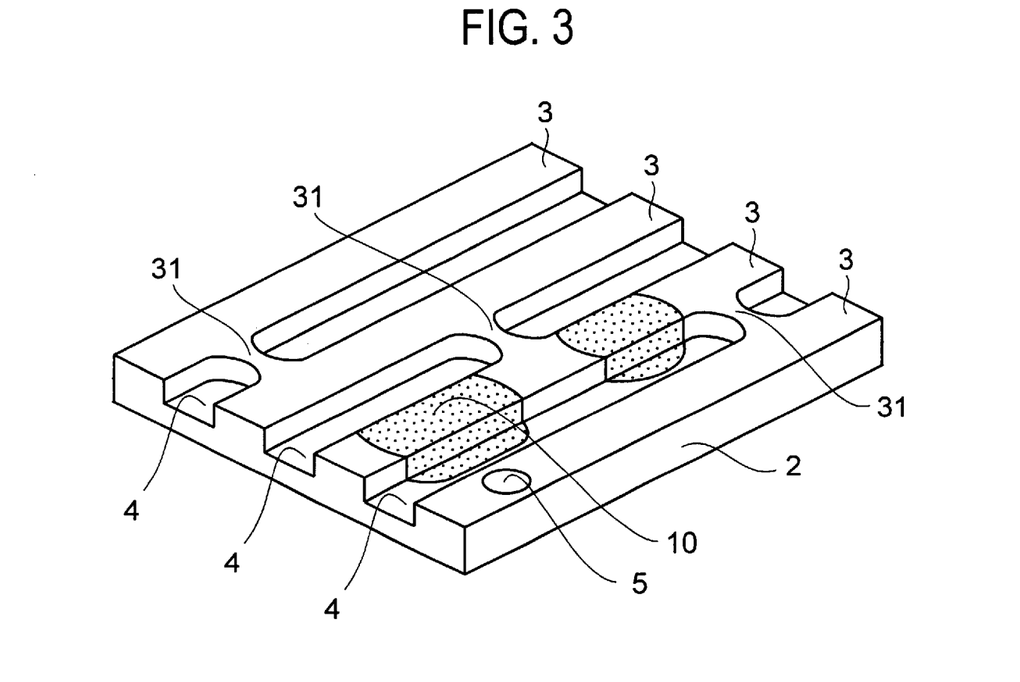
FIG. 3 is a partial perspective view of the optical recording medium according to another embodiment of the present invention.

Characteristic feature of the present invention is the provision of the bridging convex portion 31 and the bridging concave portion 41 and their use as prepits. In addition thereto, it is also possible to provide prepits which are formed by conventional manners, and the supporting substrate 2 of such embodiment is shown in FIG. 3. The supporting substrate 2 shown in FIG. 3 is the same as the supporting substrate 2 of FIG. 1 except that isolated concave portions 5 are provided in one of the continuous convex portions 3. The isolated concave portions 5 are concave portions which are isolated and not connected to the continuous concave portion 4 as in the case of conventional prepits. When such isolated concave portions 5 are to be formed, two beam process as in the cases the formation of the prepits between the grooves in the conventional medium may be adopted wherein two beams are used in the patterning of the master disk.

It should be noted that the prepits may be formed in the supporting substrate 2 of the structure shown in FIG. 2 as in the case of conventional prepits. In the production of the supporting substrate shown in FIG. 2, a stamper whose number of transcription from the master disk is an even number is used, and the prepits in such case is formed in the continuous concave portion 4 of FIG. 2, and the prepits formed will be isolated convex portions which is not connected to the continuous convex portions 3.

Figure 4:
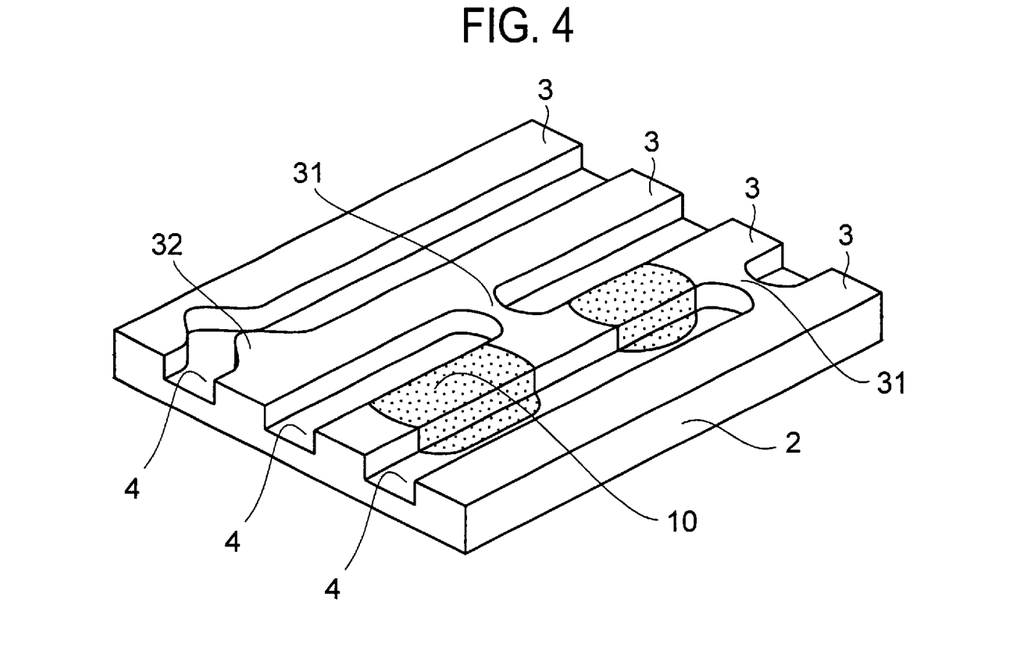
FIG. 4 is a partial perspective view of the optical recording medium according to another embodiment of the present invention.

The supporting substrate 2 shown in FIG. 4 has a structure the same as the supporting substrate 2 of FIG. 1 except that no bridging convex portion 31 is formed in any of the continuous concave portions 4, and instead, some parts of the continuous concave portion 4 are winded. In the part where the continuous concave portion 4 is winding, one of the pair of continuous convex portions 3 and 3 adjacent to the winding continuous concave portion 4 is eroded by the winding continuous concave portion 4 while a protruding part 32 is formed in the other continuous convex portion 3. The protruding part 32 functions as the prepit as in the case of the bridging convex portion 31 shown in FIG. 4. The protruding part 32 defined by the winding part of the continuous concave portion 4 may be formed by conducing the patterning of the master disk such that one exposure beam is continuously irradiated while rotating the disk to form a groove corresponding to the continuous concave portion and displacing the exposure beam for a fraction of a second in the radial direction of the disk at the position where the winding is desired. This process requires only one exposure beam, and control of the beam in the patterning may be readily accomplished.

The supporting substrate 2 shown in FIG. 4 is typically produced by using a stamper produced by transcribing the master disk manufactured in accordance with the present invention for an odd number of times. The supporting substrate 2, however, may be produced by using a stamper produced by transcribing the master disk for an even number of times. In such case, some parts of the continuous convex portion 3 becomes wound, and the part where the continuous convex portion 3 is winding, one of the pair of continuous concave portions 4 and 4 adjacent to the winding continuous convex portion 3 is eroded by the winding continuous convex portion 3 while a protruding part is formed in the other continuous concave portion 4. The protruding part functions as the prepit.

The medium of the present invention may be simultaneously provided with conventional prepits shown in FIG. 5 and the winding parts shown in FIG. 4.

In the present invention, the material used for the supporting substrate is not particularly limited, and the material may be adequately selected from resins which are adapted for injection molding, for example, polycarbonate, polymethylmethacrylate, and polyolefin. The thickness of the supporting substrate is not limited as long as the supporting substrate has a thickness which enables high precision patterning at the time of the injection molding. The preferable thickness, however, is usually in the range of 0.3 to 1.5 mm.

In the present invention, the supporting substrate may comprise a material other than resins. To be more specific, any material can be used as long as the material is adapted for patterning by using a stamper since the merits as described above are realized in the production of the master disk according to the present invention. For example, the merits of the present invention are realized even when patterns of grooves, lands and prepits are formed by 2P (photopolymer) method, and in this case, the supporting substrate comprises the glass plate and the 2P resin layer formed on the glass plate. However, in 2P method, it is also possible to use a resin plate instead of the glass plate, or to produce the supporting substrate by shaping a molten or softened glass by using a stamper.

The present invention is applicable to various optical recording mediums which use grooves or lands for the recording tracks and wherein prepits are formed such as the medium using a phase change recording material and the medium using an organic dye for the recording material. The medium using an organic dye for the recording material typically has formed therewith a recording layer and a reflective layer in this order from the side of the laser beam incidence, and typical organic dyes used include phthalocyanine, cyanine, and azo dyes. The medium using a phase change recording material typically has formed therewith a first dielectric layer, a recording layer, a second dielectric layer, and a reflective layer in this order from the side of the laser beam incidence, and typical phase change materials used include Sb—Te, Ag—In—Sb—Te, and Ge—Sb—Te materials. The constitution of the parts other than the supporting substrate is not limited, and maybe similar to those of conventional mediums.

The present invention is also applicable to a medium which has a read only area in addition to the recordable area. In such case, a reflective layer comprising a metal film (which may be the recording layer), a semi-metal film, and a dielectric multilayer film may be formed on the phase pit-formed area of the read only area.

EXAMPLES

Examples

An optical disk having the structure shown in FIG. 1 wherein the continuous concave portions 4 function as the lands and the continuous convex portions 3 function as the grooves and wherein prepits (bridging convex portions 31) are formed in the lands was manufactured by the procedure as described below.

A surface of a glass substrate which had been polished to optical degree was treated with a coupling agent, and a photoresist layer was spin coated on the thus treated surface. Residual solvent was evaporated by baking. The resulting photoresist layer had a thickness of 30 nm.

Next, exposure of the photoresist layer was accomplished by rotating the glass substrate while irradiating the layer with one laser beam which was on/off modulated. A latent image pattern which would serve the mother pattern for the continuous concave portions 4 and the bridging lands 31 shown in FIG. 1 was formed. The pause time of the laser beam irradiation was set so that the bridging land 31 had a length of 0.08 μm, 0.12 μm, or 0.16 μm. It should be noted that the continuous concave portions 4 was formed to a pitch of 0.36 μm and a width of 0.21 μm. The laser used had a wavelength of 351 nm, and the objective lens of the laser beam irradiating-optical system had a numerical aperture of 0.9.

Next, the photoresist layer was developed to obtain the disk master, and a nickel thin film was formed by electroless plating to impart the surface of the photoresist layer of the disk master with electric conductivity. Electroforming was then effected to deposit an electroformed nickel film on the nickel thin film. Then, the laminate of the nickel thin film and the electroformed nickel film was stripped from the photoresist layer and the rear surface was polished to obtain the master stamper.

A polycarbonate supporting substrate having a diameter of 120 mm and a thickness of 1.1 mm was injection molded by using the thus produced master stamper. When the surface of the supporting substrate was observed with an atomic force microscope, it was confirmed that the bridging convex portions 31 had a planar configuration that its width was minimum at or near the center between the adjacent continuous convex portions 3 and 3 as shown in FIG. 1.

Next, a reflective layer of $Al_{98}Pd_1Cu_1$ (atomic ratio) was formed on the surface of the supporting substrate to a thickness of 100 nm. A second dielectric layer of $Al_2O_3$ was then sputtered on the surface of the reflective layer to a thickness of 20 nm, and on the surface of this second dielectric layer was sputtered a phase change recording layer of $Sb_{74}Te_{18}Ge_7In_1$ (atomic ratio) to a thickness of 12 nm. A first dielectric layer of ZnS (80 mole %)–$SiO_2$ (20 mole %) was then sputtered on the recording layer to a thickness of 130 nm, and a UV-curable resin was spin coated on the first dielectric layer and cured to form a light-transmitting layer having a thickness of 100 μm. An optical disk was thereby obtained.

COMPARATIVE EXAMPLES

A master stamper was formed by repeating the procedure of the Examples as described above except that the two beam process as described above was used in the exposure step in the manufacture of the disk master using one laser beam for the formation of the latent image of the continuous concave portions and the other laser beam for the formation of the latent image of the concave portions (corresponding to the prepits) located between the adjacent continuous concave portions. The irradiation time of the laser beam in the formation of the latent image of the concave portions was set so that the concave portions had a length of 0.08 μm, 0.12 μm, or 0.16 μm. A mother stamper was then manufactured by using the master stamper, and an optical disk was manufactured by repeating the procedure of the Examples except that the supporting substrate was manufacture by using the thus produced mother stamper.

In this optical disk, the supporting substrate was produced by transcription from the mother stamper, and therefore, the continuous concave portions formed in the photoresist layer turned out to be the continuous convex portions of the supporting substrate. Since the continuous convex portions function as grooves, the prepits were present along the lands.

Evaluation

The recording layer of the optical disks used in Examples and Comparative Examples was initialized (crystallized) on a bulk eraser, and the prepits of the disks were evaluated on an optical recording medium evaluator under the conditions:
laser beam wavelength: 405 nm,
numerical aperture NA of the objective lens: 0.85,
linear velocity: 5.7 m/s, and
read power: 0.3 mW
to thereby evaluate the pit modulation (Lppb) and ratio of the pit output before the recording to the pit output after the recording (AR) defined in the DVD-RW Specification. In the recording/reading, the recording layer was irradiated with the laser beam through the light-transmitting layer, and the grooves were used for the recording. The results are shown in

TABLE 1

Table 1. The ranges defined in the Specification are:
0.18 < Lppb < 0.27, and 0.1 < AR.

| Pit length (μm) | Lppb | | AR | |
|---|---|---|---|---|
| | Example | Comparative Examples | Example | Comparative Examples |
| 0.08 | 0.19 | 0.09* | 0.14 | 0.02* |
| 0.12 | 0.24 | 0.11* | 0.18 | 0.04* |
| 0.16 | 0.26 | 0.14* | 0.20 | 0.08* |

*outside the range defined by the Specification

As shown in Table 1, the Lppb and AR of the optical disks of the Comparative Examples are significantly lower than those of the Examples. In these optical disks, the prepits formed had a length of up to 0.16 μm although it was difficult to form a prepit pattern which goes as far as near the bottom layer of the photoresist layer when the exposure time was set to a time corresponding the length of up to 0.20 μm when the two beam process was conducted at a laser wavelength of 351 nm and an NA of 0.90.

On the other hand, in the Examples as described above, a sufficiently high pit modulation is obtained at the prepit length of 0.20 μm or less since the area where the exposure is stopped and not the area where exposed in the formation of the land pattern is used as the prepit pattern.

MERITS OF THE INVENTION

In the present invention, only one beam is used in the manufacture of the disk master for the exposure, and by intermittently irradiating the disk with the beam, the area which was not irradiated with the beam is used as the prepits. As a consequence, the length of the prepits is not limited by the spot diameter of the beam used in the exposure. Decrease in the length of the prepits is thereby enabled with no substantial change in the optical system used for the exposure, and this is quite advantageous in increasing the recording density.

The present invention has also omitted the need of independently controlling the two beams in the exposure that had been required in the conventional two beam process. Use of a more simple exposure system as well as simple control are thereby enabled.

Japanese Patent Application Nos. 2000-207455, 2000-370702 and 2001-181795 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium comprising:
a supporting substrate; and
a recording layer on the substrate,
wherein a surface of the supporting substrate on which the recording layer is formed includes alternating convex portions tracks and concave tracks which are substantially parallel to each other,
wherein adjacent convex tracks are connected by bridging convex portions which extend in a transverse direction, and the bridging convex portions have a planar configuration such that their width is a minimum at or near a center between the adjacent convex tracks, and
wherein at least one of the concave tracks has winding parts each protruding into the adjacent convex track and forming a protruding part in the adjacent convex track, and said protruding parts are used as prepits.

2. An optical recording medium according to claim 1, wherein said bridging convex portions are used as prepits.

3. An optical recording medium according to claim 1, wherein isolated concave portions used as prepits are formed in said convex tracks.

4. An optical recording medium according to claim 1, wherein said convex tracks or said concave tracks are used for a recording track.

5. An optical recording medium according to claim 1, further comprising:
one of a substrate and a layer which is transparent to a recording/reading laser beam formed on said supporting substrate,
wherein said recording layer is irradiated by the laser beam that has passed through said one of the substrate and layer, and
wherein said convex tracks function as grooves and said concave tracks function as lands.

6. An optical recording medium according to claim 1, wherein said supporting substrate is transparent to a recording/reading laser beam and the recording layer is irradiated by the laser beam that has passed through the supporting substrate, and
wherein said convex tracks function as lands and said concave tracks function as grooves.

7. An optical recording medium comprising:
a supporting substrate; and
a recording layer on the substrate,
wherein a surface of the supporting substrate on which the recording layer is formed includes alternating convex tracks and concave tracks which are substantially parallel to each other,
wherein adjacent concave tracks are connected by bridging concave portions which extend in a transverse direction, and the bridging concave portions have a planar configuration such that their width is a minimum at or near a center between the adjacent concave tracks, and
wherein at least one of the concave tracks has winding parts each protruding into the adjacent convex track and forming a protruding part in the adjacent convex track, and said protruding parts are used as prepits.

8. An optical recording medium according to claim 7, wherein said bridging concave portions are used as prepits.

9. An optical recording medium according to claim 7, wherein isolated convex portions used as prepits are formed in said concave tracks.

10. An optical recording medium according to claim 7, wherein said convex tracks or said concave tracks are used for a recording track.

11. An optical recording medium according to claim 7, further comprising:
one of a substrate and a layer which is transparent to a recording/reading laser beam formed on said supporting substrate,
wherein said recording layer is irradiated by the laser beam that has passed through said one of the substrate and layer, and wherein said convex tracks function as grooves and said concave tracks function as lands.

12. An optical recording medium according to claim 7, wherein said supporting substrate is transparent to a recording/reading laser beam and the recording layer is irradiated by the laser beam that has passed through the supporting substrate, and wherein said convex tracks function as lands and said concave tracks function as grooves.

13. A method for producing an optical recording medium comprising a supporting substrate and a recording layer on the substrate wherein a surface of the supporting substrate on which the recording layer is formed includes alternating convex tracks and concave tracks which are substantially parallel to each other, and prepits are formed along the convex tracks or the concave tracks, and wherein a disk master used for producing said supporting substrate has a resist layer formed with a mother pattern of said convex tracks, said concave tracks, and said prepits are formed by:

intermittently irradiating the resist layer with a single exposure beam to form the mother pattern, and using an area irradiated with the single exposure beam for the mother pattern of the concave tracks or the convex tracks, and using an area not irradiated with the single exposure beam for the mother pattern of the prepits.

* * * * *

UNITED STATES PATENT AND TRADEMARK OFFICE
CERTIFICATE OF CORRECTION

PATENT NO. : 6,665,260 B2
DATED : December 16, 2003
INVENTOR(S) : Tatsuya Kato et al.

It is certified that error appears in the above-identified patent and that said Letters Patent is hereby corrected as shown below:

Title page,
Item [75], Inventors, change "Chuo-ku" to -- Tokyo --. (all occurrences)

Column 11,
Line 66, delete "portions".

Column 12,
Line 48, change "concave" to -- convex --;
Lines 49 and 50, change "convex" to -- concave --.

Signed and Sealed this

Thirteenth Day of July, 2004

JON W. DUDAS
*Acting Director of the United States Patent and Trademark Office*